United States Patent
Diffin et al.

(10) Patent No.: US 11,084,522 B2
(45) Date of Patent: Aug. 10, 2021

(54) STEERING COLUMN ASSEMBLY WITH ADAPTER SWEDGE

(71) Applicant: STEERING SOLUTIONS IP HOLDING CORPORATION, Saginaw, MI (US)

(72) Inventors: Daniel J. Diffin, Freeland, MI (US); Matthew T. Strickler, Marlette, MI (US); Jeremy E. Reisig, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 342 days.

(21) Appl. No.: 16/295,331

(22) Filed: Mar. 7, 2019

(65) Prior Publication Data
US 2020/0283057 A1    Sep. 10, 2020

(51) Int. Cl.
*B62D 5/04*      (2006.01)
*F16H 57/021*    (2012.01)
*F16H 1/16*      (2006.01)

(52) U.S. Cl.
CPC .............. *B62D 5/0409* (2013.01); *F16H 1/16* (2013.01); *F16H 57/021* (2013.01); *F16H 2057/0213* (2013.01)

(58) Field of Classification Search
CPC ....... B62D 5/0409; F16H 1/16; F16H 57/021; F16H 2057/0213
USPC ........................................................ 180/444
See application file for complete search history.

(56) References Cited

U.S. PATENT DOCUMENTS

| | | | |
|---|---|---|---|
| 6,354,395 B1 | 3/2002 | Cheng et al. | |
| 6,717,303 B2* | 4/2004 | Sakai | H02K 5/225 310/68 B |
| 7,360,467 B2* | 4/2008 | Segawa | B62D 5/0409 180/444 |
| 8,684,127 B2 | 4/2014 | Hama et al. | |
| 10,760,666 B2* | 9/2020 | Lee | F16H 57/021 |
| 10,953,802 B2* | 3/2021 | Motomiya | B60R 1/072 |

FOREIGN PATENT DOCUMENTS

WO    2011129280 A1    10/2011

* cited by examiner

*Primary Examiner* — Jacob B Meyer
*Assistant Examiner* — Sophia Marie McGuire
(74) *Attorney, Agent, or Firm* — Dickinson Wright PLLC (57) ABSTRACT

A steering assembly including a motor assembly, a worm assembly, and a coupler assembly is provided. The worm assembly includes a worm member defining a central axis and having first and second ends. The coupler assembly may include an adapter having a first wall defining a through-hole sized to receive a portion of the first end therein. The coupler assembly may operatively connect the motor assembly and the worm assembly. The worm member and the adapter may be arranged with one another such that pressing a swedge tool against a face of the worm member in a direction substantially parallel with the central axis deforms the first end to overlap a portion of the worm member onto a portion of the adapter adjacent the through-hole to secure the worm member and adapter to one another and to axially retain the worm member in a position relative to the central axis.

19 Claims, 7 Drawing Sheets

STEERING COLUMN ASSEMBLY WITH ADAPTER SWEDGE

TECHNICAL FIELD

The present disclosure relates to a steering column assembly including a coupling assembly for connecting a motor assembly to a worm assembly.

BACKGROUND

A steering column assembly may include a coupling assembly to connect a motor assembly to a worm assembly. For a column drive with a high system output, the worm assembly may experience high axial loading. A worm axis may be axially fixed and radially dampened on an outboard (non-motor) side bearing. To combat the high axial loading in a fixed state, a secondary retention feature may be needed for a motor side bearing.

SUMMARY

According to an embodiment of the present disclosure, a steering assembly is provided. The steering assembly includes a motor assembly, a worm assembly, and a coupler assembly. The worm assembly includes a worm member defining a central axis and having first and second ends. The coupler assembly includes an adapter having a first wall defining a through-hole sized to receive a portion of the first end therein. The coupler assembly operatively connects the motor assembly and the worm assembly. The worm member and the adapter are arranged with one another such that pressing a swedge tool against a face of the worm member in a direction substantially parallel with the central axis deforms the first end to overlap a portion of the worm member onto a portion of the adapter adjacent the through-hole to secure the worm member and adapter to one another and to axially retain the worm member in a position relative to the central axis.

According to another embodiment of the present disclosure, an electric assist assembly is provided. The electric assist assembly includes a motor assembly, a worm member, and a retention assembly. The worm member defines a central axis and includes a worm end. The retention assembly includes an adapter for securing to the motor assembly and for pressing against the worm end to secure the adapter and worm member to one another and to radially retain the worm member in position relative to the central axis. The worm member and the adapter are arranged with one another such that pressing a swedge tool against the worm end deforms the worm end and creates worm member deformation material to overlap the adapter to secure the worm member and adapter to one another and to axially retain the worm member in position relative to the central axis.

According to yet another embodiment of the present disclosure, a method for assembling a steering assembly is provided. The method includes inserting a knurl end of a worm member into a through-hole of an adapter such that a portion of the knurl end extends into a cavity defined by the adapter, pressing the adapter to the knurl end to secure the adapter to the worm member, and compressing a swedge portion of a swedge tool into a face of the knurl end such that a portion of the worm member deforms and overlaps a first wall of the adapter to axially retain the worm member in position relative to a worm member central axis.

These and other advantages and features will become more apparent from the following description taken in conjunction with the drawings.

DETAILED DESCRIPTION

Figure 1:
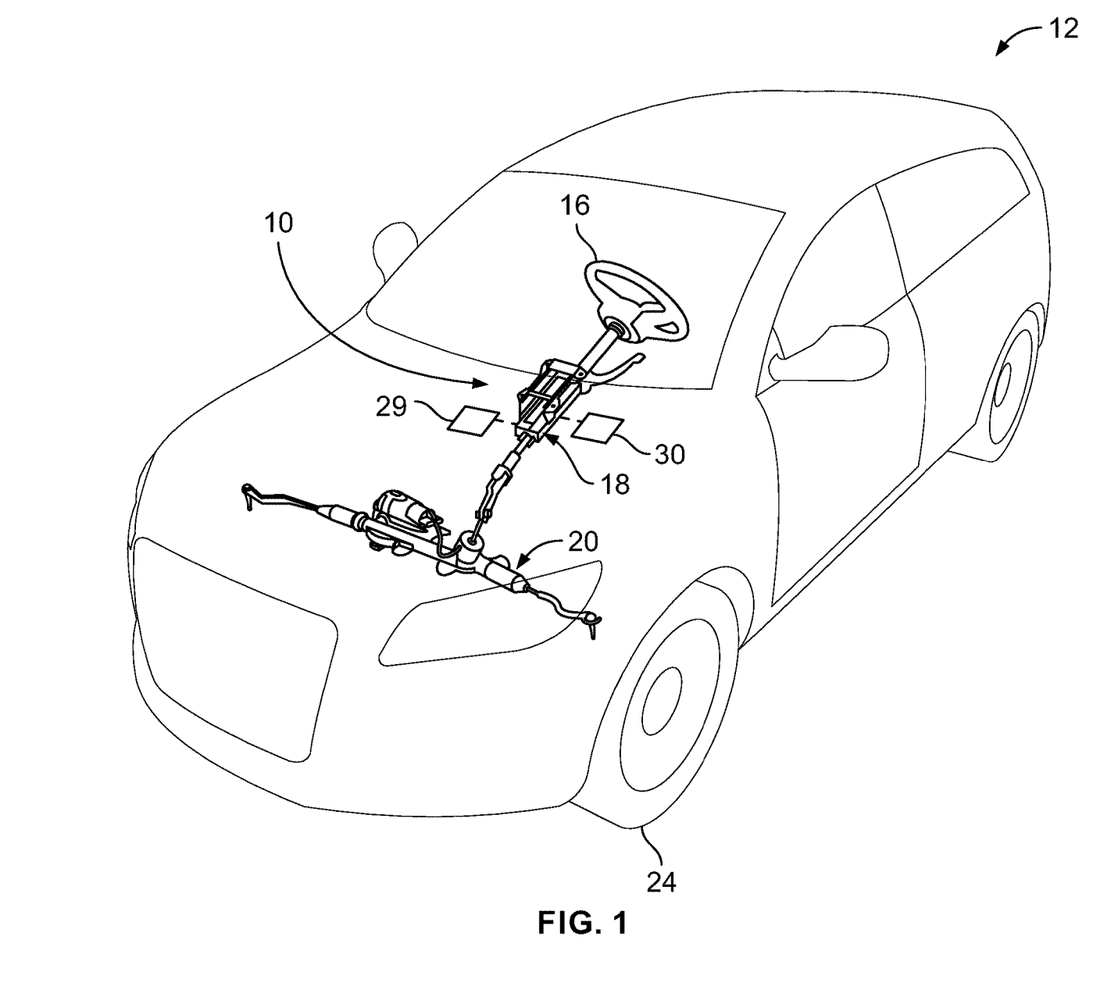
FIG. 1 is a perspective view of an example of a portion of a steering assembly.

Referring now to the Figures, where the invention will be described with reference to specific embodiments, without limiting same, FIG. 1 illustrates an example of a steering column assembly, referred to generally as a steering assembly 10 herein. The steering assembly 10 is shown disposed within a vehicle 12 in FIG. 1. The steering assembly 10 may assist in converting user inputs from a steering wheel 16 to direct movement of the vehicle 12. In this example, the vehicle 12 is a car, however, it is contemplated that the steering assembly 10 may be used to assist in steering other types of vehicles such as trucks, boats, aircraft, or other similar vehicles without departing from a scope of the present disclosure.

The steering assembly 10 may include the steering wheel 16 rotatably secured to an electric power steering assembly 18. The electric power steering assembly 18 may be operatively connected to a rack and pinion system 20. The steering wheel 16, the electric power steering assembly 18, and the rack and pinion system 20 may be arranged with one another to direct movement of a front set of wheels 24 (only one front wheel 24 is shown in FIG. 1) of the vehicle 12 based on a driver's input. For example, the rack and pinion system 20 may be operatively connected to each of the front set of wheels 24 via knuckles and tie rods to convey driver input from the steering wheel 16 for movement of each of the front set of wheels 24.

The steering assembly 10 may be in communication with a controller 29. The controller 29 may include programming to direct operation of components of the steering assembly 10 and/or to direct operation of other vehicle 12 components. The programming, for example, may trigger an output of one or more vehicle operation commands based on received signals or detected vehicle conditions.

Optionally, the steering assembly 10 may be in communication with a self-steering mechanism 30, such as an advanced driver assistance system or the like. The self-steering mechanism 30 may include programming to direct movement of the vehicle 12 without driver input to the steering wheel 16.

Figure 2A:
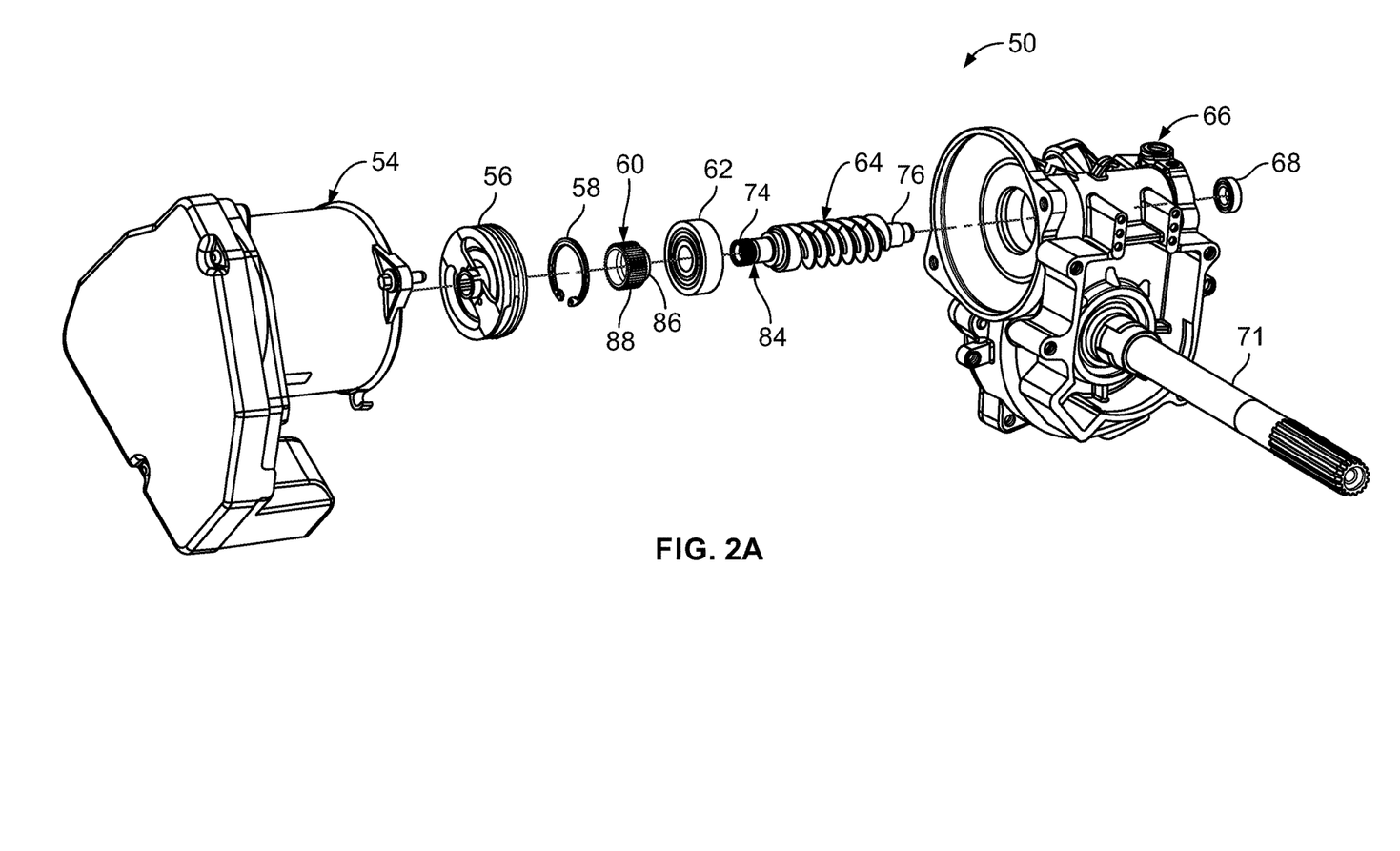
FIG. 2A is a perspective exploded view of an example of a portion of a steering assembly in accordance with an aspect of the invention.

FIG. 2A is an exploded view of a portion of an example of a steering assembly, referred to generally as a steering assembly 50 herein. The steering assembly 50 may include a motor assembly such as an electric motor 54, a flexible coupler assembly 56, a retainer ring 58, a coupler adapter 60, a first ball bearing 62, a worm assembly including a worm member 64, an assist assembly 66, and a second ball bearing 68. The flexible coupler assembly 56 may be assembled to the electric motor 54. The coupler adapter 60 and the first ball bearing 62 may be pressed to the worm member 64. The retainer ring 58 may assist in holding the coupler adapter 60, the first ball bearing 62, and the worm member 64 within the assist assembly 66. The second ball bearing 68 may be mounted on an outboard end of the worm member 64 and may be held in place by a de-lash mechanism (not shown) housed within the assist assembly 66.

The electric motor 54 may operate to generate power for transfer to the worm member 64. The worm member 64 may be meshed with a worm gear (not shown in FIG. 2A) to transfer torque to a shaft 71. The shaft 71 may be mechanically coupled to a steering wheel to assist in rotating the steering wheel with torque generated by the electric motor 54. This coupling arrangement may also be referred to as power steering.

The flexible coupler assembly 56 may operate to assist in mechanically coupling the electric motor 54 to the worm member 64 to transfer torque therebetween. The retainer ring 58 may operate to secure the coupler adapter 60, the first ball bearing 62, and the worm member 64 within a housing of the assist assembly 66 such that the worm member 64 may be retained in position and rotate. The coupler adapter 60 may assist in operatively connecting a drive shaft of the electric motor 54 to the worm member 64. For example, the coupler adapter 60 and the first ball bearing 62 may be pressed to the worm member 64 to facilitate a joining operation.

The first ball bearing 62 and the second ball bearing 68 may be arranged with the worm member 64 to assist in retaining the worm member 64 within the housing of the assist assembly 66 while permitting rotation of the worm member 64. For example, the first ball bearing 62 may be arranged within the steering assembly 50 to support functionality of the de-lash mechanism supporting the second ball bearing 68 such that the worm member 64 may pivot at the first ball bearing 62.

Figure 2B:
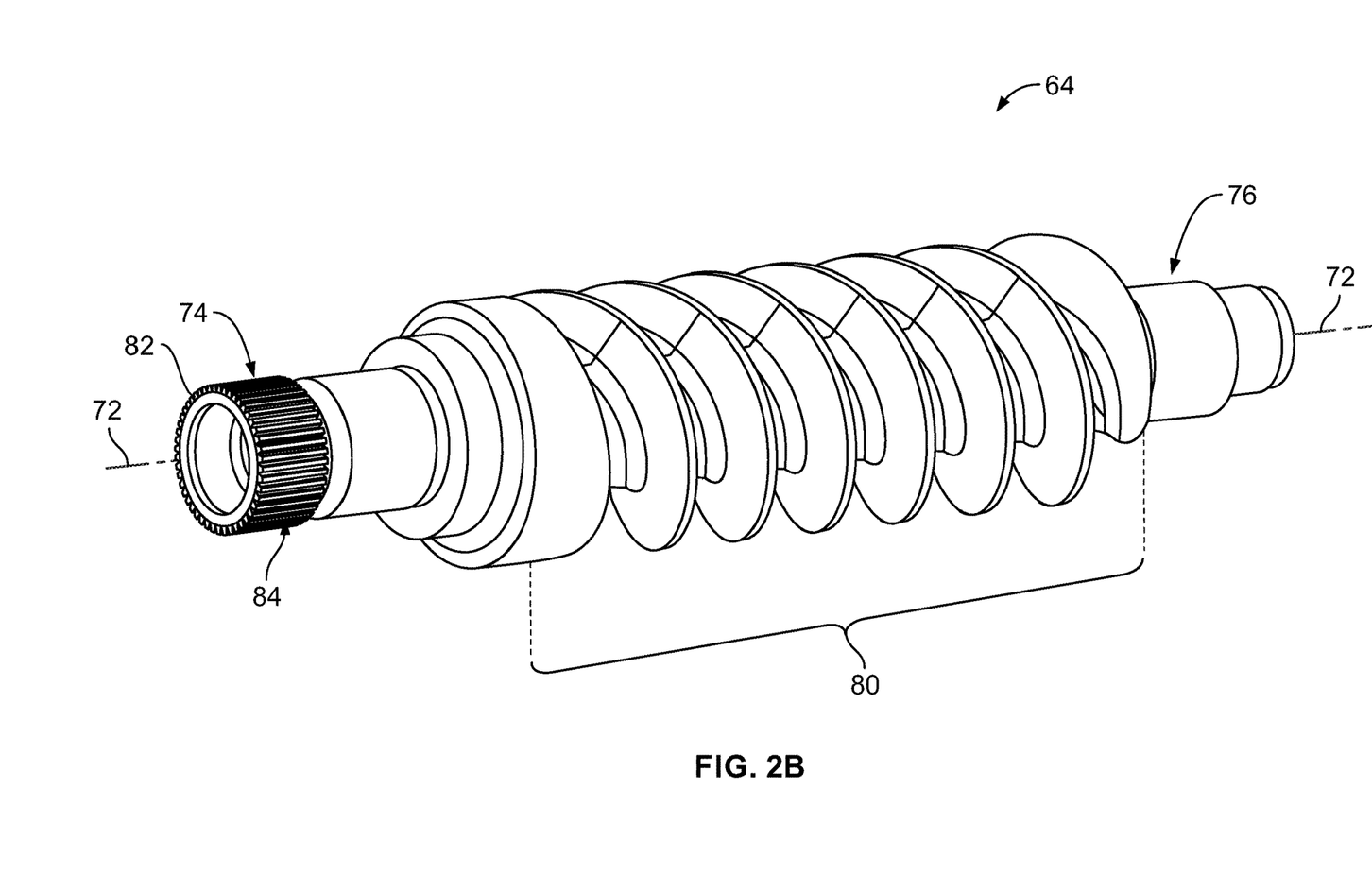
FIG. 2B is a detailed perspective view of an example of a worm member of the steering assembly of FIG. 2A in accordance with an aspect of the invention.

FIG. 2B is a detailed perspective view of the worm member 64. The worm member 64 may define a central axis 72 and may include a first end 74 and a second end 76. A worm thread 80 may extend between the first end 74 and the second end 76. The worm thread 80 may define a groove for meshing with teeth of a gear as further described herein. The first end 74 may define a face 82 on a plane substantially perpendicular to the central axis 72. The first end 74 may also define one or more knurls 84 to assist in securing the worm member 64 to an adapter portion of a steering assembly as further described herein. Each knurl of the one or more knurls 84 may be spaced equidistant from the central axis 72. The one or more knurls 84 assist in providing a radial retention feature for the worm member 64. A primary purpose of each of the one or more knurls 84 is to provide interference to ensure the coupler adapter 60 does not slip when mounted to the worm member 64.

For example, when the coupler adapter 60 is mounted to the first end 74 of the worm member 64, portions of the worm member 64 deform and overlap onto the coupler adapter 60 to secure the coupler adapter 60 to the worm member 64 as further described below. As such, the coupler adapter 60 may radially retain the worm member 64 and prevent movement of the worm member 64 in a radial direction relative to the central axis 72.

Figure 2C:
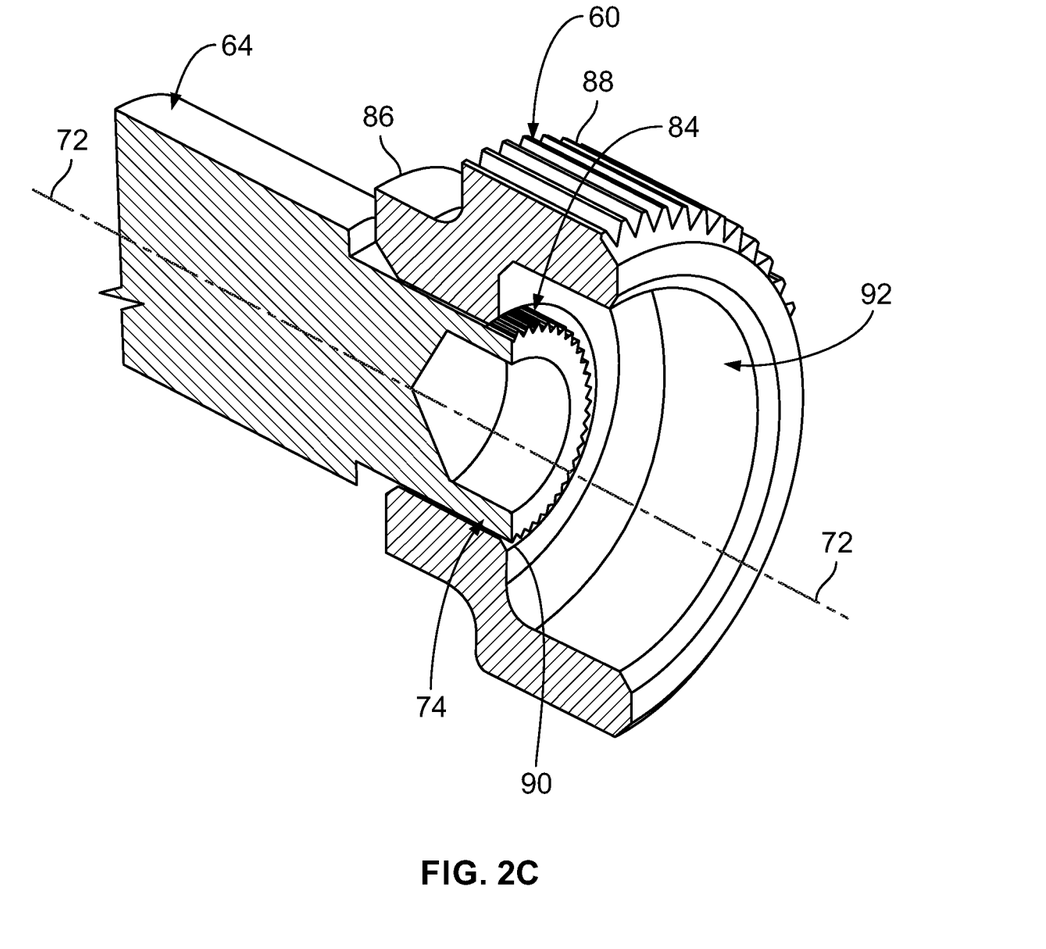
FIG. 2C is a perspective view, in partial cross-section, of an example of a worm member and adapter of the steering assembly of FIG. 2A in accordance with an aspect of the invention.

FIG. 2C is a perspective view, in partial cross-section, of an example of a connection region of the coupler adapter 60 and the worm member 64. The coupler adapter 60 may include a first wall 86 and a second wall 88. The first wall 86 may define a first circular shape having a diameter smaller than a diameter defined by a second circular shape of the second wall 88. While shown in FIG. 2C with different diameters, it is contemplated that the first wall 86 and the second wall 88 may share a same diameter. The first wall 86 may define an opening 90 sized to receive a portion of the first end 74 of the worm member 64. An inner rim of the coupler adapter 60 may extend about the opening 90. The second wall 88 may define a cavity 92. The coupler adapter 60 and the worm member 64 may be arranged with one another such that the first end 74 of the worm member 64 at least partially extends through the opening 90 and into the cavity 92. The coupler adapter 60 and the first end 74 of the worm member 64 may be secured to one another via, for example, deformation of the coupler adapter 60 relative to the one or more knurls 84.

This arrangement may assist in facilitating securement of the coupler adapter 60 to the first end 74 of the worm member 64. A tooling assembly may apply compression forces to the coupler adapter 60. These compression forces may deform material of the first wall 86 such that the deformed material overlaps onto the one or more knurls 84 and secures the coupler adapter 60 to the worm member 64. This securement assists in retaining the worm member 64 in position and preventing axial and/or radial movement of the worm member 64 relative to the central axis 72. The worm member 64 and the coupler adapter 60 may be arranged with one another such that when the adapter is pressed to the first end 74 of the worm member 64, an adapter central axis is in line with the central axis 72 of the worm member. This securement further assists in transferring power from the electric motor 54 to the assist assembly 66 as now described.

Figure 3:
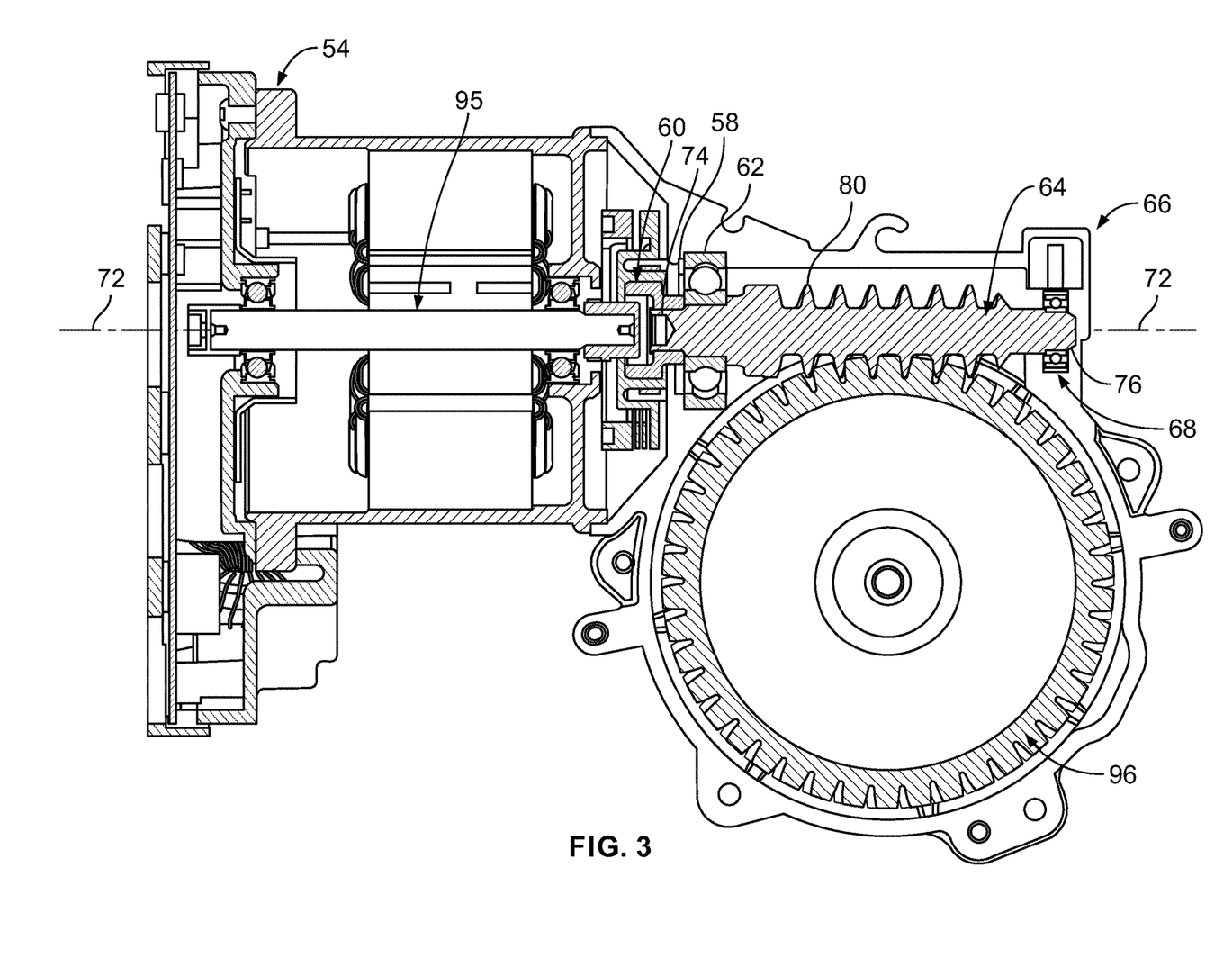
FIG. 3 is a side view, in cross-section, of a portion of the steering assembly of FIG. 2A in accordance with an aspect of the invention.

FIG. 3 illustrates details of an operative connection of the electric motor 54 and the assist assembly 66. For example, the coupler adapter 60 may be secured to the worm member 64 as described above to transfer rotation from an electric motor shaft 95 to the worm member 64. The first ball bearing 62 and the second ball bearing 68 may operate with one another or separately to offset axial loading generated along the central axis 72 and/or to offset radial loading generated relative to the central axis 72.

Figure 4:
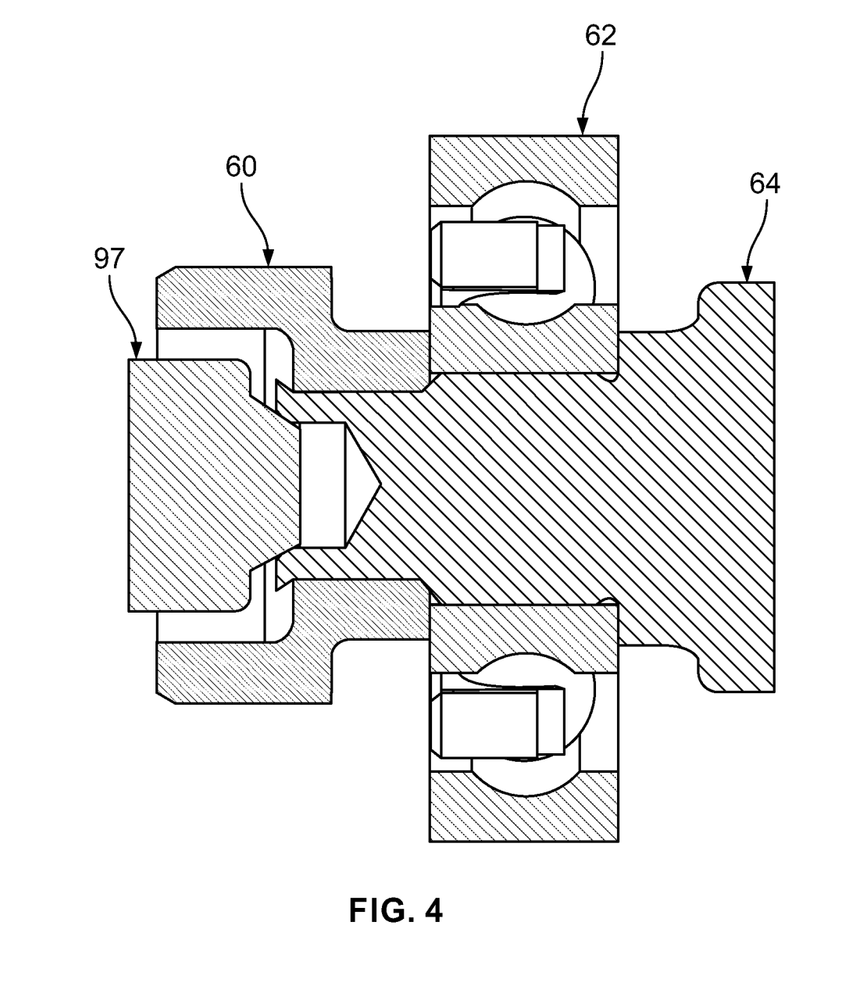
FIG. 4 is a detailed view, in cross-section, of a portion of the steering assembly of FIG. 2A illustrating another aspect of the invention.

FIG. 4 illustrates details of a portion of a method for assembling components of a steering assembly such as the steering assembly 10 described herein. In FIG. 4, a swedge tool 97 of a tool assembly is shown partially inserted into the worm member 64. This partial insertion of the swedge tool 97 deforms a portion of the worm member 64 such that material of the worm member 64 is deformed and overlaps a portion of the coupler adapter 60 to secure the coupler adapter 60 to the worm member 64 as further described herein.

As shown in FIG. 3, the worm thread 80 of the worm member 64 may mesh with teeth of a worm gear 96 to transfer power from the electric motor 54 to the worm gear 96. The worm gear 96 may be operatively connected to a portion of a steering assembly such that the electric motor 54 may assist in providing, for example, power steering capabilities.

Figure 5:
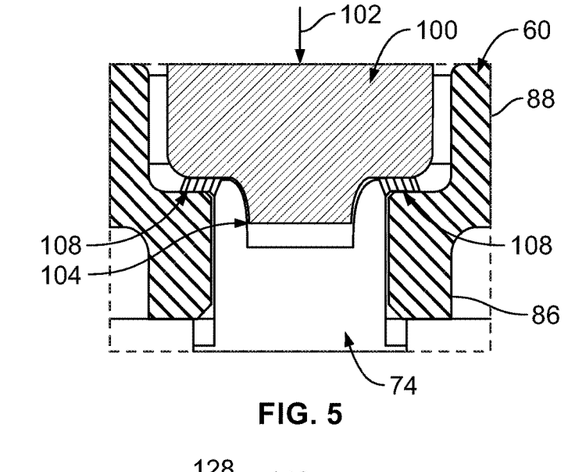
FIG. 5 is a side view, in cross-section, of an example of a portion of a method for assembling a steering assembly in accordance with an aspect of the invention.
Figure 6:
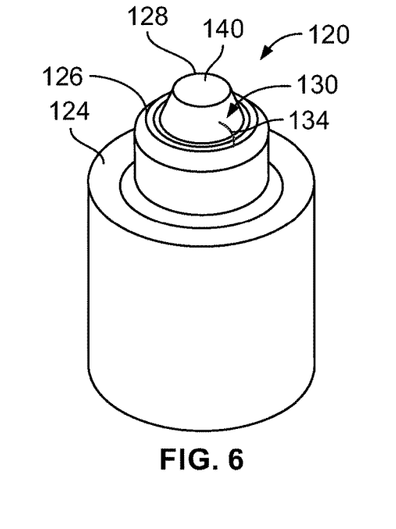
FIG. 6 is a perspective view of an example of a portion of a swedge tool for assisting in assembling a steering assembly in accordance with an aspect of the invention.
Figure 7:
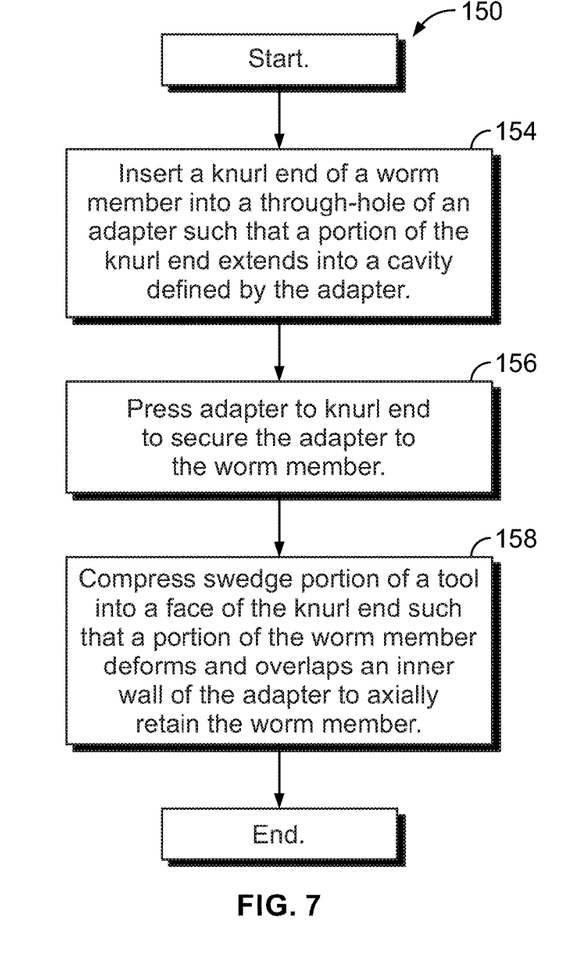
FIG. 7 is a flow chart illustrating an example of a method for assembling a steering assembly in accordance with an aspect of the invention.

FIGS. 5 through 7 illustrate portions of a method for assembling components of a steering assembly.

FIG. 5 is a cross-sectional view illustrating an example of a portion of a swedge tool 100 pressed into the first end 74 of the worm member 64 by a force (represented by force arrow 102). The swedge tool 100 may be mounted to, for example, a manual or an automatic press machine. The swedge tool 100 may include a nose 104 for pressing to the first end 74. The nose 104 may also be referred to as a second portion 128 herein. Pressing the nose 104 against the first end 74 may deform the first end 74 such that material thereof is deformed and overlaps the coupler adapter 60 as shown by overlap materials 108 to secure the coupler adapter 60 to the worm member 64. In this example, the nose 104 is shown having a cylindrical shape however various shapes are available for the nose 104 based on a desired deformation of material the nose 104 will be pressed against.

FIG. 6 is a perspective view of an example of portion of a swedge tool 120. The swedge tool 120 is for pressing against, for example, the first end 74 of the worm member 64. The swedge tool 120 includes a base portion 124, a first portion 126 extending from the base portion 124, and a second portion 128 extending from the first portion 126. The second portion 128 may also be referred to as a nose herein. Each of the base portion 124 and the first portion 126 may be cylindrically shaped as shown in FIG. 6. It is also contemplated that each of the base portion 124 and the first portion 126 may define other shapes.

In the example shown in FIG. 6, the second portion 128 defines an angle portion 130. The angle portion 130 may also be referred to as a first contact surface and is offset at an angle 134 relative to an upper surface of the first portion 126. A value of the angle 134 may be based on an additional axial retention robustness of the coupler adapter 60. A value of the angle 134 may be based on an amount of desired deformation without going beyond an ultimate strength. In one example, the angle value may be substantially equal to between 18 degrees and 28 degrees. An upper surface of the second portion 128 may be referred to as a second contact surface 140. The second contact surface 140 may contact a portion of the face 82 (the face 82 is shown in FIG. 2B) of the worm member 64 when the swedge tool 120 is pressed against the worm member 64.

FIG. 7 is a flow chart illustrating operational steps of a method for assembling components of a steering assembly, referred to generally as a method 150 herein. In operation 154, a knurl end of a worm member, such as the first end 74 of the worm member 64, may be inserted into a through-hole of an adapter, such as insertion of the first end 74 into the opening 90 of the coupler adapter 60. The knurl end of the worm member may be inserted into the through-hole such that a portion of the knurl end extends into a cavity defined by the adapter, such as the cavity 92 defined by the coupler adapter 60 described above.

In operation 156, a portion of an adapter may be pressed against the knurl end of the worm member to secure the adapter to the knurl end. In operation 158, a swedge portion of a tool, such as the swedge tool 100, may be compressed against a face of the knurl end, such as the face 82. This compression of the swedge portion against the face may deform material of the worm member such that the material overlaps the adapter to secure the worm member to the adapter.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A steering assembly comprising:
a motor assembly;
a worm assembly including a worm member defining a central axis and having first and second ends; and
a coupler assembly including an adapter having a first wall defining a through-hole sized to receive a portion of the first end therein, the coupler assembly operatively connecting the motor assembly and the worm assembly,
the worm member and the adapter being arranged with one another such that pressing a swedge tool against a face of the worm member in a direction substantially parallel with the central axis deforms the first end to overlap a portion of the worm member onto a portion of the adapter adjacent the through-hole to secure the worm member and adapter to one another and to axially retain the worm member in a position relative to the central axis.

2. The assembly of claim 1, wherein the first end defines a set of knurls along an outer surface, the first end further defining the face as oriented on a plane substantially perpendicular to the central axis, the worm member and the adapter being further arranged with one another such that pressing the first wall of the adapter against the set of knurls radially retains the worm member in a position relative to the central axis.

3. The assembly of claim 2, wherein each knurl of the set of knurls is spaced equidistant from the central axis.

4. The assembly of claim 1 further comprising an assist assembly housing the worm member, the coupler assembly further including a retainer ring disposed between the motor assembly and the worm member, the retainer ring being arranged with the adapter to retain the worm member and the adapter within the assist assembly.

5. The assembly of claim 4, wherein the worm member and the adapter are further arranged with one another such that when the adapter is pressed to the first end of the worm member, an adapter central axis is in line with the central axis of the worm member.

6. The assembly of claim 1, wherein the worm member and the adapter are further arranged with one another such that pressing an angle portion of the swedge tool against the face of the worm member deforms the first end to overlap the portion of the worm member onto the portion of the adapter adjacent the through-hole to secure the worm member and adapter to one another and to axially retain the worm member in a position relative to the central axis.

7. The assembly of claim 1, wherein the adapter further includes a second wall defining a cavity open to the through-hole, and the worm member and the adapter being further arranged with one another such that a portion of the first end of the worm member extends into the cavity.

8. An electric assist assembly comprising:
a motor assembly;
a worm member defining a central axis and including a worm end; and
a retention assembly including an adapter for securing to the motor assembly and for pressing against the worm end to secure the adapter and worm member to one another and to radially retain the worm member in position relative to the central axis,
the worm member and adapter being arranged with one another such that pressing a swedge tool against the worm end deforms the worm end and creates worm member deformation material to overlap the adapter to secure the worm member and adapter to one another and to axially retain the worm member in position relative to the central axis.

9. The assembly of claim 8, wherein the adapter includes a first wall defining a through-hole sized to receive a portion of the worm end, the first wall being sized and of a material to receive a force to join the first wall and the worm end to one another.

10. The assembly of claim 9, wherein the adapter further includes a second wall defining a cavity open to the through-hole, the worm member and the adapter being further arranged with one another such that a portion of the worm end extends into the cavity.

11. The assembly of claim 9 further comprising:
an assist assembly including a housing;
a first ball bearing disposed upon the worm member between the worm end and a worm thread; and
a second ball bearing disposed upon another worm end opposite the worm end,
the first ball bearing and the second ball bearing being arranged with the worm member to assist in retaining the worm member within the housing while permitting rotation of the worm member about the central axis.

12. The assembly of claim 9 further comprising a worm gear including a set of teeth, the worm gear being in operable communication with a steering wheel, the worm member further defining a central region including a worm thread, the worm member and the worm gear being arranged with one another such that the set of teeth meshes with the worm thread to transfer rotational movement from the motor assembly to the worm gear.

13. The assembly of claim 12 further comprising a shaft and a steering wheel mounted to the shaft, the worm gear defining a gear central axis and the shaft being mounted to the worm gear and extending along the gear central axis such that the motor assembly supplies power to the steering wheel to operate as a power steering system.

14. The assembly of claim 8, wherein the worm end is a knurl end having one or more knurls and a face on a plane oriented substantially perpendicular to the central axis.

15. The assembly of claim 8 further comprising an assist assembly housing the worm member, the retention assembly further including a retainer ring disposed between the motor assembly and the worm member, the retainer ring being arranged with the adapter to retain the worm member and the adapter within the assist assembly.

16. A method for assembling a steering assembly comprising:
inserting a knurl end of a worm member into a through-hole of an adapter such that a portion of the knurl end extends into a cavity defined by the adapter;
pressing the adapter to the knurl end to secure the adapter to the worm member; and
compressing a swedge portion of a swedge tool into a face of the knurl end such that a portion of the worm member deforms and overlaps a first wall of the adapter to axially retain the worm member in position relative to a worm member central axis.

17. The method of claim 16, wherein the swedge portion includes a nose having a contact surface defining a first area, the face of the knurl end defining a second area greater than the first area.

18. The method of claim 16, wherein the knurl end and the adapter are arranged with one another such that the pressing of the adapter to the knurl end axially retains the worm member in position relative to the worm member central axis.

19. The method of claim 16 further comprising:
a first ball bearing defining a first center point located upon the worm member central axis; and
a second ball bearing defining a second center point located upon the worm member central axis,
the ball bearings being arranged with the worm member to offset axial loading generated along the central axis.

* * * * *